(12) United States Patent
Gou et al.

(10) Patent No.: US 11,956,167 B2
(45) Date of Patent: *Apr. 9, 2024

(54) CHANNEL CONFIGURATION METHOD AND TERMINAL, STORAGE MEDIUM AND ELECTRONIC DEVICE

(71) Applicant: ZTE Corporation, Shenzhen (CN)

(72) Inventors: Wei Gou, Shenzhen (CN); Peng Hao, Shenzhen (CN); Zhisong Zuo, Shenzhen (CN); Ting Fu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,107

(22) Filed: May 22, 2023

(65) Prior Publication Data

US 2023/0299903 A1 Sep. 21, 2023

Related U.S. Application Data

(63) Continuation of application No. 17/056,182, filed as application No. PCT/CN2019/087434 on May 17, 2019, now Pat. No. 11,736,246.

(30) Foreign Application Priority Data

May 18, 2018 (CN) .......................... 201810482650.2

(51) Int. Cl.
*H04L 5/00* (2006.01)
*H04W 72/0446* (2023.01)
(Continued)

(52) U.S. Cl.
CPC .......... *H04L 5/0044* (2013.01); *H04L 5/0053* (2013.01); *H04W 72/0446* (2013.01);
(Continued)

(58) Field of Classification Search
CPC ... H04L 5/0044; H04L 5/0053; H04L 5/0007; H04L 5/0094; H04W 72/0446;
(Continued)

(56) References Cited

U.S. PATENT DOCUMENTS 10,681,682 B2 6/2020 Wu et al.
11,218,998 B2 * 1/2022 Takeda .................. H04W 80/08
(Continued)

FOREIGN PATENT DOCUMENTS

CN 106664520 A 5/2017
CN 106982184 A 7/2017
(Continued)

OTHER PUBLICATIONS

Japanese office action issued in JP Patent Application No. 2021-514467, dated Apr. 18, 2023, 14 pages. English translation included.
(Continued)

*Primary Examiner* — Hashim S Bhatti
(74) *Attorney, Agent, or Firm* — Perkins Coie LLP

(57) ABSTRACT

Provided are a channel configuration method and terminal, a storage medium and an electronic device. The method includes: determining that multiple physical channels overlap in a time domain; and determining a physical channel for carrying information or data in the multiple physical channels, wherein the determined physical channel is a Physical Uplink Control Channel (PUCCH), and determining a physical channel comprises: among the multiple physical channels, processing a physical channel with earlier first symbol before a physical channel with later first symbol, and when two or more physical channels in the multiple physical channels have the same first symbol, processing a physical channel with a larger number of symbols before a physical channel with a smaller number of symbols.

12 Claims, 5 Drawing Sheets

(51) Int. Cl.
*H04W 72/0453* (2023.01)
*H04W 72/21* (2023.01)
*H04W 72/53* (2023.01)

(52) U.S. Cl.
CPC ....... *H04W 72/0453* (2013.01); *H04W 72/21* (2023.01); *H04W 72/53* (2023.01); *H04L 5/0007* (2013.01)

(58) Field of Classification Search
CPC . H04W 72/0453; H04W 72/21; H04W 72/53; H04W 72/1263
See application file for complete search history.

(56) References Cited

U.S. PATENT DOCUMENTS

| | | | |
|---|---|---|---|
| 11,234,224 B2* | 1/2022 | Takeda | H04W 28/06 |
| 2021/0144702 A1* | 5/2021 | Zhao | H04L 5/0044 |
| 2021/0218519 A1 | 7/2021 | Gou et al. | |

FOREIGN PATENT DOCUMENTS

| | | |
|---|---|---|
| CN | 107734680 A | 2/2018 |
| CN | 107734688 A | 2/2018 |
| CN | 110505698 A | 11/2019 |
| WO | 2017078465 A1 | 5/2017 |
| WO | 2017132810 A1 | 8/2017 |
| WO | 2018111948 A1 | 6/2018 |

OTHER PUBLICATIONS

ZTE, "Remaining issues for multiplexing UCI on PUSCH," 3GPP TSG RAN WG1 Meeting #93, R1-1806133, 12 pages.
Qualcomm Incorporated, "Remaining issues for overlapping UL transmissions," 3GPP TSG RAN WG1 Meeting #93, R1-1807359, Busan, Korea, May 21-25, 2018, 12 pages.
3GPP TSG RAN WG1 Meeting 93, Ericsson, "On UCI Multiplexing on PUCCH", May 21-25, 2018, R1-1807251.
3GPP TSG Ran WG1 Meeting 93, ETRI, "Remaining issues for PUCCH Structure in Long Duration", May 21-25, 2018, R1-1806667.
European Search Report for corresponding application EP19804593. 2; Report dated Jun. 9, 2021.
International Search Report for corresponding application PCT/CN2019/087434 filing May 17, 2019; dated Aug. 7, 2019.
Search Report issued in Chinese Patent Application No. 201810482650. 2; Application Filing Date May 18, 2018; dated Aug. 17, 2022 (3 pages).
Japanese office action issued in JP Patent Application No. 2021-514467, dated Nov. 15, 2023, 19 pages. English translation included.
Intel Corporation, "PUSCH-PUCCH and PUCCH-PUCCH collision handling," 3GPP TSG RAN WG1 Meeting #92bis, R1-1804729, Sanya, China, Apr. 16-20, 2018, 7 pages.
Indonesian office action issued in ID Patent Application No. P00202009414, dated May 23, 2023, 6 pages. English translation included.
Vietnamese office action issued in VN Patent Application No. 1-2020-07182, dated Jan. 24, 2024, 3 pages. English translation included.
European office action issued in EP Patent Application No. 19804593. 2, dated Dec. 21, 2023, 3 pages.

* cited by examiner

CHANNEL CONFIGURATION METHOD AND TERMINAL, STORAGE MEDIUM AND ELECTRONIC DEVICE

This application is a Continuation of Ser. No. 17/056,182, filed Nov. 17, 2020, which claims benefit of PCT/CN2019/087434, filed May 17, 2019, which claims priority to Chinese Patent Application No. 201810482650.2, filed with the China National Intellectual Property Administration (CNIPA) on May 18, 2018, the disclosures of which are incorporated herein by reference in their entirety.

TECHNICAL FIELD

The present disclosure relates to the field of communications, and in particular, to a channel configuration method and terminal, a storage medium and an electronic device.

BACKGROUND

In related technologies, multiple physical channels (e.g., the combination of one or more Physical Uplink Control Channels (PUCCH) and/or one or more Physical Uplink Shared Channels (PUSCH)) for one piece of User Equipment (UE) are respectively composed of one or more Orthogonal Frequency Division Multiplexing (OFDM) symbols in the time domain, and the multiple physical channels may overlap with each other in a slot in the time domain (for example, all or part of the OFDM symbols overlap). In particular, when the multiple physical channels are uplink physical channels, it is generally required that the multiple physical channels are not transmitted simultaneously and only one physical channel can be transmitted at a time, therefore it is possible that the finally transmitted physical channel is one of multiple physical channels overlapping in the time domain.

For time domain overlapping between multiple channels, FIG. 1 is a schematic diagram of a possible case of time domain overlapping between two channels in the related art of the present disclosure. It should be noted that although an exemplary schematic diagram is provided in FIG. 1, the case of time domain overlapping is not limited to the case shown in FIG. 1. For example, symbol overlapping may occur between one PUCCH channel and one PUSCH of a UE in a slot. Several cases of time domain overlapping between two channels are shown in FIG. 1 (any overlapping between multiple channels is referred to as time domain overlapping). It should be noted that, in FIG. 1, the overlapping between a PUCCH and a PUSCH is taken as an example (the overlapping may also occur between two channels of the same type), but the time domain overlapping among more than two channels is also possible. The PUCCH1 and PUCCH2 in FIG. 1 are merely for distinguishing two different physical channels. In the related art, the PUCCH is defined in five formats, and the PUCCH can carry many types of Uplink Control Information (UCI) (e.g., Hybrid Automatic Repeat Request (HARQ-ACK), Scheduling Request (SR), Channel State Information (CSI) (which can specifically be classified into CSI-1 and CSI-2)), therefore there are many cases after different formats and different UCI types are combined, and the cases shown in FIG. 1 are merely exemplary cases used to explain the overlapping problem.

In the related art, for multiple physical channels overlapping in the time domain, several solutions are provided for physical channels having the same starting position, and these solutions are standardized in the 3GPP TS38.213 protocol. How to handle physical channels that do not have aligned starting symbols is under further discussion. It is currently proposed that when a certain timeline relationship is satisfied among the multiple physical channels, if the physical channels are able to be handled according to the solution in the related art, the solution in the related art is adopted for handling the physical channels; if the physical channels are unable to be handled according to the solution in the related art, a solution needs to be further provided for these physical channels.

FIG. 2 shows a schematic diagram of a timeline. Specifically, FIG. 2 is a schematic diagram of a timeline ending time in the related art of the present disclosure. The current definition for the timeline is not detailed enough, for example, which physical channel should serve as a basis for the definition for the timeline ending time is still not clarified. Taking the case c of FIG. 1 as an example, the timeline ending time is defined to be the starting position of the physical channel with the earlier time in the two physical channels illustrated in FIG. 1, then the starting position for the PUCCH in the case c of FIG. 1 should be defined as the timeline ending time. The solution in FIG. 2 follows the definition for the timeline ending time in accordance with the working assumptions put forward by the New Radio (NR) (the working assumptions in the 3GPP Ran1 92 bis conference).

According to the working assumption in the related art, an example diagram of the definition for the timeline ending time can be obtained (in other cases, the definition for the timeline ending time is the same). In FIG. 2, the PUSCH and the PUCCH are overlapped in the time domain and the PUSCH is earlier than the PUCCH, therefore, the timeline ending time is defined to be a starting position (which is marked by the dotted line in FIG. 2) of the PUSCH.

Concerning the described problem existing in the related art, no effective solution has been found at present.

SUMMARY

Provided are a channel configuration method and terminal, a storage medium and an electronic device.

According to an embodiment of the present disclosure, a channel configuration method is provided, including: determining that multiple physical channels overlap in a time domain; selecting a designated channel to carry information or data in the multiple physical channels.

According to an embodiment of the present disclosure, a channel configuration method is provided, including: determining that multiple physical channels overlap in a time domain; selecting a designated channel for transmitting transmission data.

According to another embodiment of the present disclosure, a channel configuration terminal is provided, including: a first determination module, configured to determine that multiple physical channels overlap in a time domain; a configuration module, configured to select a designated channel to carry information or data in the multiple physical channels.

According to another embodiment of the present disclosure, a channel configuration terminal is provided, including: a third determination module, configured to determine that multiple physical channels overlap in a time domain; a selecting module, configured to select a designated channel for transmitting transmission data.

According to another embodiment of the present disclosure, a storage medium is further provided, wherein the storage medium stores a computer program, and the computer program is configured to execute the operations in any method embodiment when running.

According to another embodiment of the present disclosure, also provided is an electronic device, including a memory and a processor, wherein the memory stores a computer program, and the processor is configured to run the computer program to execute the operations in any method embodiment mentioned above.

By means of the solutions proposed in the embodiments of the present disclosure, when physical channels overlap in a time domain, a starting position of a designated channel which is determined to be used is set as timeline ending time. By defining timeline ending time of a channel which is to be used for transmitting data, the technical problem in the related art that the definition for timeline ending time is not precise for channels overlapping in the time domain is solved, thereby facilitating the timeline arrangement in product implementation, and enabling the timeline to be more compact and efficient.

BRIEF DESCRIPTION OF THE DRAWINGS

Drawings are provided for further understanding of the solution in the embodiments of the present disclosure and form a part of the description. The exemplary embodiments of the present disclosure and the description on the exemplary embodiments of the present disclosure are used to explain the present disclosure rather than to limit the present disclosure. In the drawings.

DETAILED DESCRIPTION OF THE EMBODIMENTS

Hereinafter, the present disclosure will be described in detail with reference to the accompanying drawings and embodiments. It is important to note that the embodiments of the present disclosure and the characteristics in the embodiments can be combined under the condition of no conflicts.

It should be noted that, terms such as "first" and "second" in the description, claims, and accompanying drawings of the present disclosure are used to distinguish similar objects, but are not necessarily used to describe a specific sequence or order.

Embodiment 1

Figure 3:
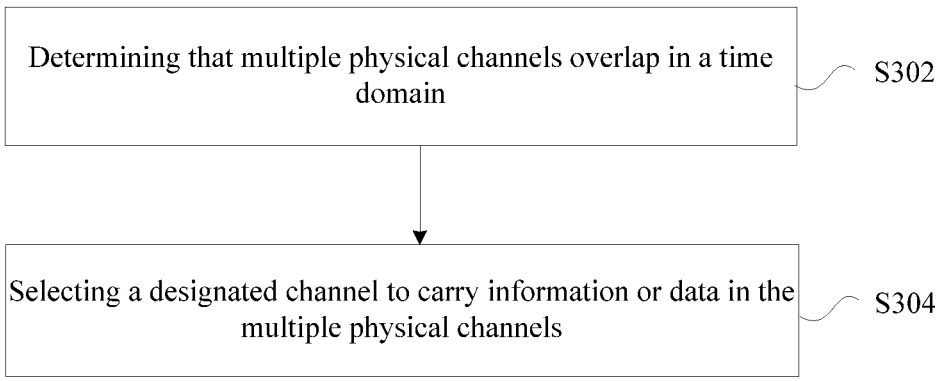
FIG. 3 is a flowchart of a channel configuration method according to an embodiment of the present disclosure.

The present embodiment provides a channel configuration method. FIG. 3 is a flowchart of a channel configuration method according to an embodiment of the present disclosure. As shown in FIG. 3, the flow includes the following operations.

In operation S302, it is determined that multiple physical channels overlap in a time domain.

In operation S304, a designated channel is selected to carry information or data in the multiple physical channels.

The solution of this embodiment may further include: a latest time among timeline ending time of preparation durations required for preparation of to-be-transmitted data corresponding to respective ones of the multiple physical channels is determined to be an earliest starting time of the designated channel.

By means of the described operations, when physical channels overlap in a time domain, a starting position of a designated channel which is determined to be used is set as timeline ending time. By defining timeline ending time of a channel which is to be used for transmitting data, the technical problem in the related art that the definition for timeline ending time is not precise for channels overlapping in the time domain is solved, thereby facilitating the timeline arrangement in product implementation, and enabling the timeline to be more compact and efficient.

In one or more exemplary implementations of the present embodiment, the executer of the foregoing operations may be a terminal, such as a mobile phone, but is not limited thereto.

In one or more exemplary implementations of the present embodiment, a first Orthogonal Frequency Division Multiplexing (OFDM) symbol of the designated channel is not earlier than any one of preparation durations required for preparation of to-be-transmitted data corresponding to respective ones of the multiple physical channels (being not earlier than any one of preparation durations required for preparation of to-be-transmitted data corresponding to respective ones of the multiple physical channels includes the following cases: being on any one of preparation durations required for preparation of to-be-transmitted data corresponding to respective ones of the multiple physical channels; or being later than any one of preparation durations required for preparation of to-be-transmitted data corresponding to respective ones of the multiple physical channels. Other similar expressions should be interpreted in the same way). Herein, the preparation duration is calculated starting from a last symbol of a channel or signal corresponding to each of the multiple physical channels, respectively.

In one or more exemplary implementations of the present embodiment, when User Equipment (UE) transmits multiple overlapping Physical Uplink Control Channels (PUCCH) in a designated slot, the UE is configured to multiplex different types of Uplink Control Information (UCI) in one PUCCH, and the UE multiplexes all the corresponding types of UCI in one PUCCH to solve the multiple physical channels overlapping in the time domain.

In one or more exemplary implementations of the present embodiment, the designated channel is a designated PUCCH. When the different types of UCI comprise Hybrid Automatic Repeat Request-Acknowledgement (HARQ-ACK), in the designated slot, a first symbol of the designated PUCCH is not earlier than a symbol with a first serial number of N1+X, and is not earlier than a symbol with a second serial number of N2+Y, wherein the first serial number is counted starting from a last symbol of symbols for Physical Downlink Shared Channel (PDSCH) or Semi Persistent Scheduling (SPS) PDSCH release corresponding to the first serial number, the second serial number is counted starting from a last symbol of symbols for PDCCH corresponding to the second serial number, where N1 is the number of symbols which corresponds to duration required for receiving a PDSCH and reflects a PDSCH processing capability, N2 is the number of symbols which corresponds to duration required for preparing a PUSCH and reflects a PUSCH processing capability, and N1, N2, X and Y all represent the number of OFDM symbols.

In one or more exemplary implementations of the present embodiment, the designated channel is a designated PUCCH or a designated Physical Uplink Shared Channel (PUSCH). When the UE transmits one or multiple overlapping PUCCH and PUSCH in one slot and the UE multiplexes all the corresponding types of UCI in one PUSCH, in the overlapping PUCCH and PUSCH in the slot, a first symbol of the designated PUCCH or the designated PUSCH is not earlier than a symbol with a third serial number of N1+X, and not earlier than a symbol with a fourth serial number of N2+Y, wherein the third serial number is counted starting from a last symbol of symbols for PDSCH or SPS PDSCH release corresponding to the third serial number, and the fourth serial number is counted starting from a last symbol of symbols for PDCCH corresponding to the fourth serial number, where N1, N2, X and Y all represent the number of OFDM symbols.

In one or more exemplary implementations of the present embodiment, the operation that the designated channel is selected includes: the designated channel is selected from a physical channel set of UE or physical channel resources of the UE.

In one or more exemplary implementations of the present embodiment, the operation that the designated channel is selected includes one of the following: one of the multiple physical channels overlapping in the time domain is selected as the designated channel; a physical channel is selected from other physical channels except the multiple physical channels overlapping in the time domain as the designated channel.

Figure 4:
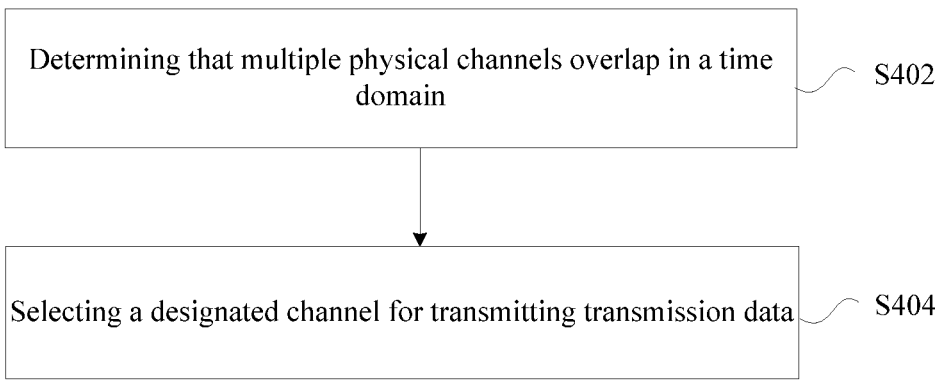
FIG. 4 is a flowchart of another channel configuration method according to an embodiment of the present disclosure.

Another channel configuration method running on the mobile terminal is provided in the present embodiment. FIG. 4 is a flowchart of another channel configuration method according to an embodiment of the present disclosure. As shown in FIG. 4, the flow includes the following operations.

In operation S402, it is determined that multiple physical channels overlap in a time domain.

In operation S404, a designated channel for transmitting transmission data is selected.

In one or more exemplary implementations of the present embodiment, the operation that it is determined that the multiple physical channels overlap in the time domain includes: it is determined that a physical channel overlaps with multiple time division physical channels in the time domain.

In one or more exemplary implementations of the present embodiment, the operation that the designated channel for transmitting transmission data is selected includes: a physical channel is selected from the multiple time division physical channels as the designated channel.

In one or more exemplary implementations of the present embodiment, the operation that a physical channel is selected from the multiple time division physical channels as the designated channel includes one of the following:

selecting, from the multiple time division physical channels, one or more physical channels with a largest number of symbols as the designated channel;

selecting, from the multiple time division physical channels, one or more physical channels with a smallest number of symbols as the designated channel;

selecting, from the multiple time division physical channels according to indication information from a base station, one or more physical channels as the designated channel;

selecting, from the multiple time division physical channels, one or more physical channels with a latest starting position as the designated channel;

selecting, from the multiple time division physical channels according to a policy agreed between UE and a base station, one or more physical channels as the designated channel.

In one or more exemplary implementations of the present embodiment, after it is determined that the multiple physical channels overlap in the time domain, the method further includes one of the following: preferentially processing, among the multiple physical channels, two physical channels with the earliest starting position to obtain an intermediate physical channel, and processing the intermediate physical channel and a next physical channel by treating the intermediate physical channel and the next physical channel as two physical channels overlapping in the time domain; in a case where the multiple physical channels comprise time division multiplexed physical channels, processing the time division multiplexed physical channels, and discarding other physical channels except the time division multiplexed physical channels; in the multiple physical channels, preferentially processing a first physical channel and a second physical channel with the earliest time among the multiple physical channels overlapping in the time domain to obtain one physical channel, and sequentially processing the obtained physical channel and a physical channel with the earliest time in remaining physical channels overlapping in the time domain, wherein when channels have aligned starting positions, one of the following is used as a criteria for preferential selection: selecting a physical channel with a minimum starting frequency domain index, a physical channel with a maximum starting frequency domain index, a physical channel with a maximum number of symbols, or a physical channel with a minimum number of symbols.

Through the description of the foregoing embodiments, a person skilled in the art should clearly understand that the methods according to the foregoing embodiments may be implemented by software in combination with a necessary universal hardware platform, and definitely may also be implemented by hardware. However, in many cases, the former is a preferred implementation. Based on such understanding, the essence of the technical solutions of the embodiments of the present disclosure or the part of the technical solutions of the embodiments of the present disclosure contributing to the related art can be embodied in the form of a software product. The computer software product can be stored in a storage medium (such as a ROM/RAM, a magnetic disk, and an optical disk), and includes several instructions for enabling a terminal device (which may be a mobile phone, a computer, a server, or a network device) to execute the method described in each embodiment of the present disclosure.

Embodiment 2

The embodiment further provides a channel configuration terminal, which is configured to implement the foregoing embodiments and implementations, and what has been described is not repeated herein. The term "module", as used hereinafter, is a combination of software and/or hardware capable of realizing a predetermined function. Although the apparatus described in the following embodiments may be implemented by software, implementation by hardware or a combination of software and hardware is also possible and conceivable.

Figure 5:
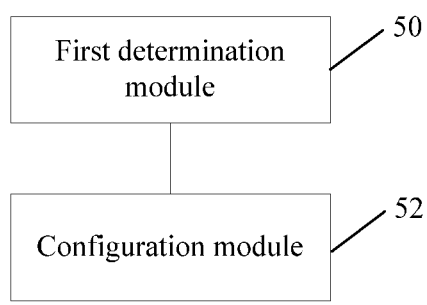
FIG. 5 is a structural block diagram of a channel configuration terminal according to an embodiment of the present disclosure.

FIG. 5 is a structural block diagram of a channel configuration terminal according to an embodiment of the present disclosure. As shown in FIG. 5, the device includes:
 a first determination module 50, configured to determine that multiple physical channels overlap in a time domain;
 a configuration module 52, configured to select a designated channel to carry information or data in the multiple physical channels.

In one or more exemplary implementations of the present embodiment, the terminal may further include: a second determination module, configured to determine a latest time among timeline ending time of preparation durations required for preparation of to-be-transmitted data corresponding to respective ones of the multiple physical channels to be an earliest starting time of the designated channel.

Figure 6:
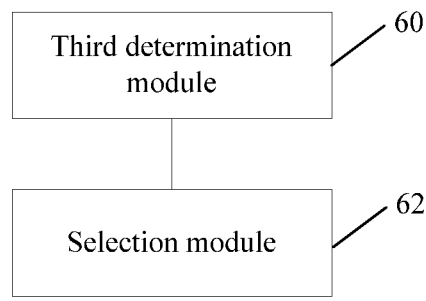
FIG. 6 is a structure diagram of another channel configuration terminal according to an embodiment of the present disclosure.

FIG. 6 is a structural block diagram of another channel configuration terminal according to an embodiment of the present disclosure. As shown in FIG. 6, the device includes:
 a third determination module 60, configured to determine that multiple physical channels overlap in a time domain;
 a selecting module 62, configured to select a designated channel for transmitting transmission data.

In one or more exemplary implementations of the present embodiment, the third determination module 62 includes: a determination unit, configured to determine that one physical channel overlaps with multiple time division physical channels in the time domain.

It should be noted that each module may be implemented by software or hardware. The latter may be implemented in the following manner, but is not limited thereto. All the modules are located in a same processor; alternatively, the modules are located in different processors in an arbitrary combination.

Embodiment 3

The present embodiment provides a method for defining a timeline ending time in a case of time domain overlapping, so as to effectively solve a problem of data transmission in the channel when multiple physical channels overlap in a time domain.

Multiple physical channels of a UE are respectively formed by one or more OFDM symbols in the time domain, and the multiple physical channels may have time domain overlapping in a slot. When the multiple physical channels overlap in the time domain, it is also possible that the physical channel that is finally transmitted is a physical channel other than the multiple physical channels. Herein, the physical channel other than the multiple physical channels may be a physical channel originally not arranged to transmit data (if the physical channel is originally arranged to transmit data, then this physical channel is possible to be included in the multiple physical channels, that is, this physical channel would be counted in the multiple physical channels overlapping in the time domain), and may also be a physical channel which is originally arranged to transmit data but does not overlap with one or more of the multiple physical channels. The time domain position of this other physical channel may actually overlap with one or more physical channels of the multiple physical channels in the time domain, and may also not overlap with any one of the multiple physical channels in the time domain.

Figure 7:
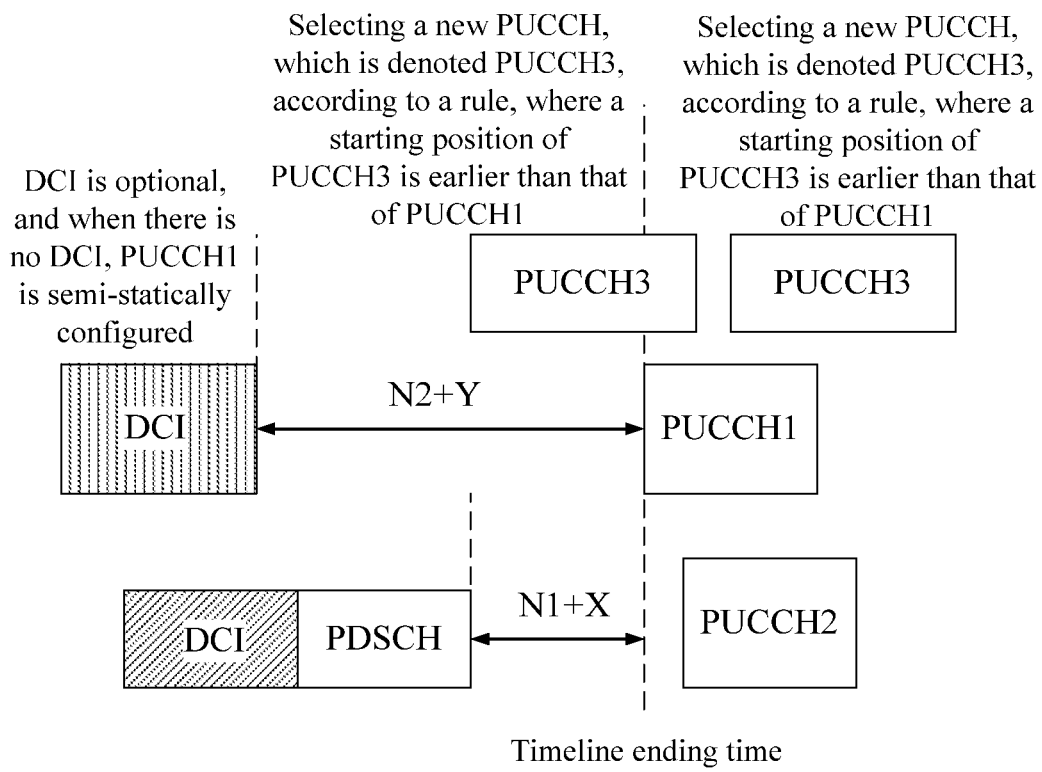
FIG. 7 is an exemplary diagram showing the overlapping of two PUCCH in the time domain according to an embodiment of the present disclosure.

Possible problems in the related art are described below based on an example. It needs to be noted that the same problem also exists for the overlapping between other different physical channels in the time domain, and the different physical channels may be different types of physical channels. FIG. 7 is an exemplary diagram showing the overlapping of two PUCCH in the time domain according to an embodiment of the present disclosure. For example, in FIG. 7, when two PUCCH channels overlap in time domain, PUCCH1 carries periodic Channel State Information (CSI, which includes CSI part1 and/or CSI part2 (respectively marked as CSI-1 and CSI-2)), and PUCCH2 carries A/N (indicating HARQ-ACK). If the two channels satisfy a timeline relationship requirement (i.e. before the timeline ending time, all the data to be transmitted should be readily prepared, otherwise the data to be transmitted cannot be timely transmitted), the A/N bit information in PUCCH2 and the CSI bit information in PUCCH1 are serially connected (herein, the connection order of the A/N and the CSI is not limited) and then carried in the channel for transmission. However, if the total number of bits after the A/N and the CSI are connected exceeds the bearing capacity of PUCCH1, then another physical channel needs to be selected for transmitting the A/N and the CSI (selection rules are provided in the related art, see TS 38.213). Assuming that another PUCCH resource (denoted as PUCCH3) is selected for transmission, the starting symbol of PUCCH3 may not be aligned with the starting symbol of PUCCH1. In this embodiment, PUCCH3 may be a certain PUCCH resource configured for the UE or a certain PUCCH resource in a certain PUCCH set.

In the related art of this embodiment, the UE can be configured with one or more PUCCH sets, and can also be directly configured with one or more PUCCH resources. If the UE is configured with one or more PUCCH sets and each PUCCH set includes one or more PUCCH resources, starting positions of respective PUCCH resources in one PUCCH set may be the same or different. The starting positions of respective PUCCH resources in different PUCCH sets may be the same or different. The ranges of the total numbers of bits that can be carried in different PUCCH resources from one PUCCH set are the same, and the ranges of the total numbers of bits that can be carried in different PUCCH resources from different PUCCH sets are different.

If PUCCH3 and PUCCH1 have the same starting symbol, then PUCCH3 can be used for transmission in the above mentioned time domain overlapping case and no problem will be caused.

However, if the starting position of PUCCH3 is earlier than the starting position of PUCCH1, disorder of timeline may occur, According to the original timeline, the data to be transmitted can be get readily prepared by the starting position of PUCCH1. However, PUCCH3 starts earlier than PUCCH1, so the data to be transmitted cannot be readily prepared before the start of PUCCH3. The cause of this problem is that, in the related art, the timeline ending time is defined according to the earlier channel (i.e., PUCCH1) of the physical channels overlapping in the time domain, and this definition for the timeline ending time leads to the consequence that such time domain overlapping case cannot be processed normally, resulting in an error. This is the reason why the solution in the related art of using the starting position of an earlier physical channel in two physical channels (PUCCH1 and PUCCH2) overlapping in the time domain as the timeline ending time is considered to be inappropriate in the embodiments of the present disclosure.

On the other hand, if the starting position of PUCCH3 is later than the starting position of PUCCH1, that is to say, the data to be transmitted is readily prepared in advance (before the starting position of PUCCH3), this will not result in malfunctioning, however, the optimum starting point should obviously be the starting position of PUCCH3 and data to be transmitted only needs to be prepared before the starting point of PUCCH3. If the data to be transmitted is prepared in advance, the efficiency utilization of the timeline is not the highest.

In view of the above problems, the solutions for solving the problems are given below in the following examples.

Example 1

In the timeline definition, the timeline ending time is defined to be the starting position of the physical channel that is finally transmitted.

For the cases where multiple physical channels overlap in the time domain, the transmission rules for the corresponding data to be transmitted are provided for respective time domain overlapping cases, and these transmission rules can be used to determine which physical channel is finally used and how the data in each overlapping channel is to be processed. For example, in a, b, g, and h in FIG. 1, a PUSCH channel is finally used for transmission, and information in the PUCCH channel is transmitted in the PUSCH. For a specific transmission rule, reference can be made to the solutions in the related art. The cases of 1 (lower case of L) and m in FIG. 1 have similar processing rules, and generally one physical channel is selected from the multiple physical channels or a new physical channel is selected for transmission (for a specific selection rule, reference can be made to the TS 38.213 protocol). For another example, for the cases in FIG. 1 that the starting positions of two physical channels overlapping in the time domain are different, it is under discussion that, when two overlapping physical channels satisfy a certain timeline relationship, a method in the related art may be used for processing, or a new scheme may be designed in the future.

That is to say, for multiple physical channels overlapping in the time domain, the base station and the UE can always determine a physical channel to be finally used for transmission according to a specific overlapping condition of the physical channels.

Figure 8:
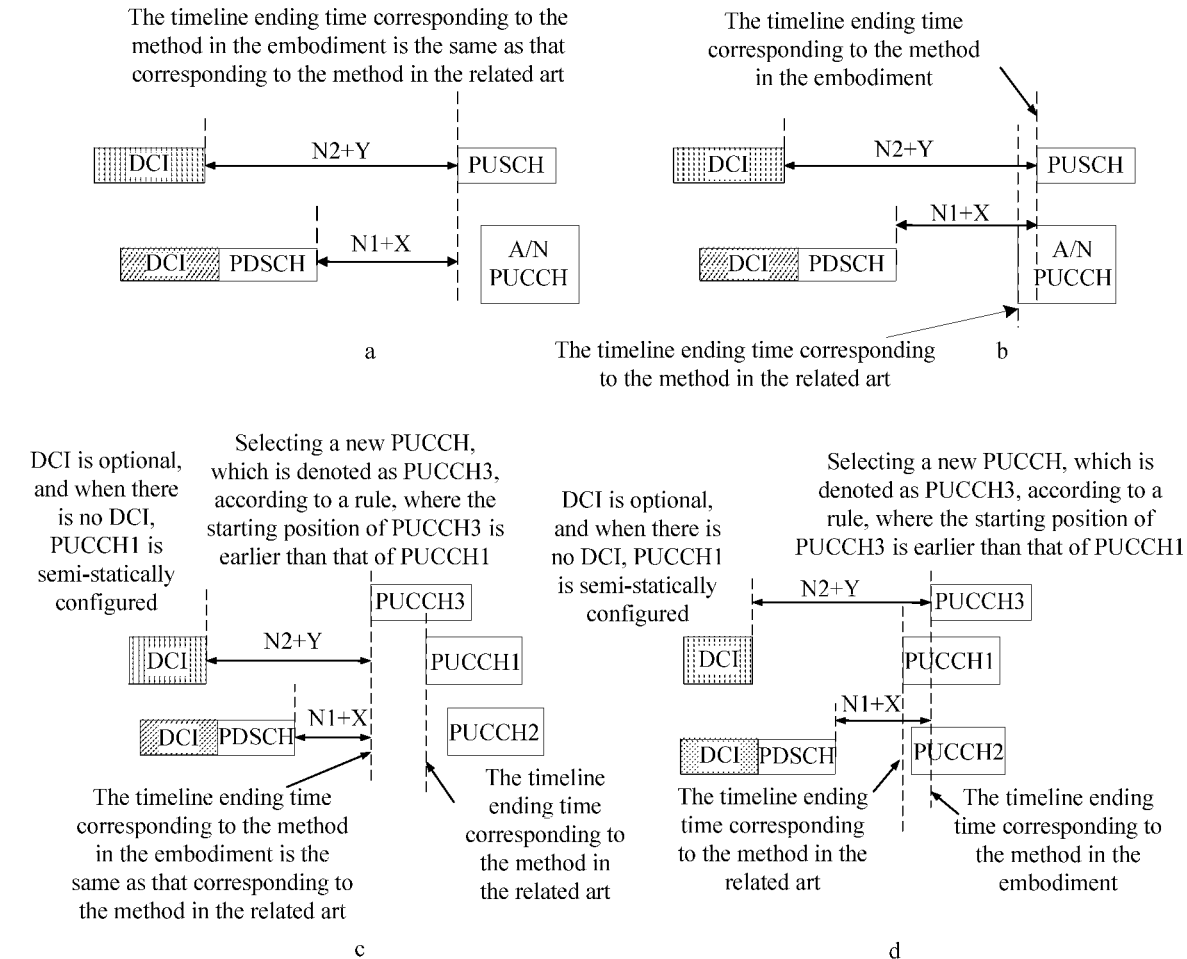
FIG. 8 is a schematic diagram of determining timeline ending time according to an embodiment of the present disclosure.

In order to maximize the utilization efficiency of the timeline to enable more time domain overlapping cases to be processed efficiently, i.e. to avoid that several time domain overlapping cases cannot be processed due to an unreasonable setting of the timeline ending time. In this embodiment, it is proposed that, for a UE, if multiple physical channels overlap in the time domain, the timeline ending time is defined to be a starting position of a physical channel finally used. The physical channel that is finally used may be one of the multiple physical channels overlapping in the time domain (this can be determined according to existing rules), or may be a physical channel other than the multiple physical channels overlapping in the time domain (this can also be determined). FIG. 8 is a schematic diagram of determining timeline ending time according to an embodiment of the present disclosure, and FIG. 8 shows several exemplary cases. In a of FIG. 8, the finally used channel is a current PUSCH channel, and therefore the timeline ending time is defined to be the starting position of the current PUSCH (the final result is the same as the timeline ending position of the related art). In b of FIG. 8, the finally used channel is the current PUSCH channel, and therefore the timeline ending time is defined to be the starting position of the current PUSCH (the final result is different from the timeline ending position in the related art). In c of FIG. 8, the finally used channel is another physical channel, i.e. PUCCH3, and thus the timeline ending time is defined to be the starting position of PUCCH3 (the final result is different from the timeline ending position in the related art). In d of FIG. 8, the finally used channel is another physical channel, i.e. PUCCH3, and therefore the timeline ending time is defined to be the starting position of PUCCH3 (the final result is different from the timeline ending position in the related art). FIG. 8 shows the case where N1+X and N2+Y have the same ending points, but actually N1+X and N2+Y may have different ending points. If N1+X and N2+Y have different ending points, the timeline ending time corresponding to the method in the present embodiment corresponds to the later ending point in the ending points of N1+X and N2+Y. That is to say, the timeline ending time corresponding to the method of the present embodiment is not earlier than any one of the ending points of N1+X and N2+Y.

Figure 1:
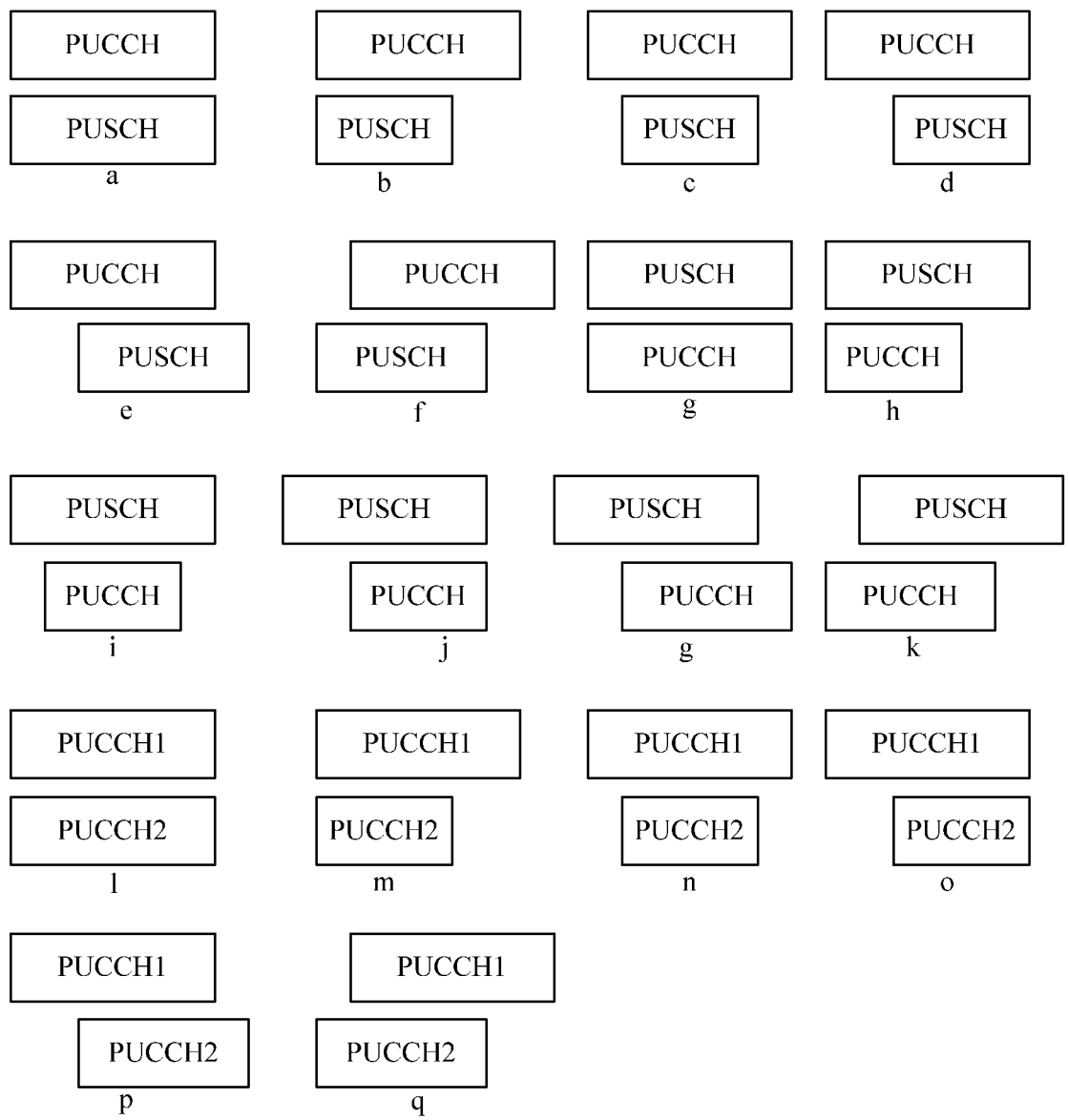
FIG. 1 is a schematic diagram of possible cases of overlapping between two channels in the time domain in the related art of the present disclosure.
Figure 2:
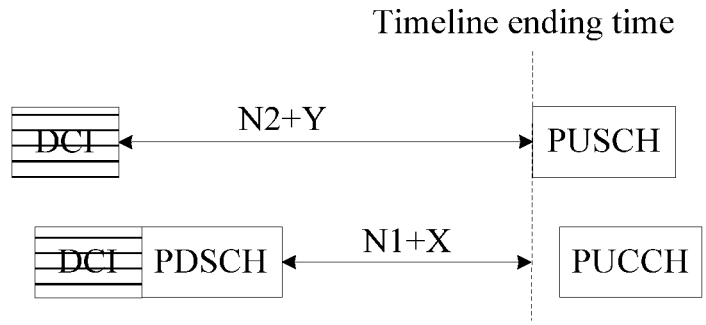
FIG. 2 is a schematic diagram of timeline ending time in the related art of the present disclosure.

For example, in the case c of FIG. 1, if a PUSCH channel is finally used according to a rule, the timeline ending time is defined to be the starting position of the PUSCH in the embodiment, rather than the starting position of the PUCCH in the related art. Since the starting position of the physical channel finally transmitted is used as the timeline ending time, the timeline ending time is delayed, so that more time domain overlapping can be addressed and the burden on the time arrangement for processing timeline can be reduced.

For another example, in the case q of FIG. 1, if the channel PUCCH1 is finally used according to a rule, the timeline ending time is defined to be the starting position of PUCCH1 in the embodiment, rather than the starting position of PUCCH2 in the related art. Since the starting position of the physical channel finally transmitted is used as the timeline ending time, and the timeline ending time is delayed, so that more time domain overlapping can be addressed, and the burden on the time arrangement for processing timeline can be reduced.

Apparently, the timeline ending time defined by the method according to the embodiment of the present invention is more accurate than the one defined by the related art, and is beneficial to the timeline arrangement in product implementation, so that the timeline is more compact and efficient.

An example is provided below.

For a UE, when multiple physical channels overlap in one slot (completely overlap or partially overlap in the time domain), where the multiple physical channels may all be PUCCH or PUSCH, or a combination of PUCCH and PUSCH, the UE expects that when the processing timeline for the data to be transmitted in multiple physical channels satisfies the requirements, the UE transmits the information in the multiple physical channels through a PUCCH or PUSCH which is finally determined (actually used) (i.e. when the processing timeline requirement is satisfied, the UE handles the overlapping between the multiple physical channels in the time domain). When the processing timeline for the data to be transmitted in multiple physical channels does not satisfy the requirements, the UE does not handle the overlapping between the multiple physical channels in the time domain and considers the case as an error configuration.

The requirements needing to be satisfied for the processing timeline are specifically described below.

For the UE, the UE expects the first symbol of the finally determined PUCCH or PUSCH is not earlier than any one of preparation durations T1, T2, Tn required for preparation of to-be-transmitted data corresponding to respective ones of the multiple (assuming the number of the physical channels is m, m being a positive integer greater than 1) physical channels (in the embodiment, the Tn value here corresponds to the nth physical channel among the m physical channels, where n=1, 2, . . . , m, and the meaning of Tn in the following description is the same as the meaning explained herein and thus will not be further described. The Tn value may also be represented using the number of symbols). The preparation durations T1, T2, Tn are respectively calculated starting from the last symbol of the channel or signal corresponding to each physical channel in the multiple physical channels. For example, in a of FIG. 8, the signal corresponding to the PUSCH is the DCI (which is carried in the PDCCH) before the "N2+Y" in the figure, and the channel corresponding to the A/N PUCCH is the PDSCH before the "N1+X" in the figure, then the preparation duration corresponding to the PUSCH is N2+Y, and the preparation duration corresponding to the PUSCH is N1+X. For another example, in c of FIG. 8, a signal corresponding to PUCCH1 is the DCI before "N2+Y" in the figure, and a channel corresponding to PUCCH2 is the PDSCH before "N1+X" in the figure, then the preparation duration corresponding to PUCCH1 is N2+Y, and the preparation duration corresponding to PUCCH2 is N1+X. Occasionally, the corresponding channel or signal is absent for certain cases, for example, the case of semi-static configuration (semi-persistent configuration). In this case, it may be assumed that there exists the corresponding channel or signal, that is, the starting point of the duration T1, T2, . . . , Tn is given. The finally determined PUCCH or PUSCH channel may be one of the multiple physical channels, or may be a physical channel other than the multiple physical channels. If the finally determined PUCCH or PUSCH channel is a physical channel other than the multiple physical channels, the following optional requirement (this requirement may also not be supported) can be further considered: the first symbol of the earliest physical channel among the multiple physical channels is not earlier than any one of the preparation durations T1, T2, . . . , Tn required for preparation of the to-be-transmitted data corresponding to respective ones of the multiple physical channels, and the first symbol of the finally determined PUCCH or PUSCH channel is not earlier than any one of the preparation durations T1, T2, Tn required for the preparation of the to-be-transmitted data corresponding to respective ones of the multiple physical channels, where the durations T1, T2, Tn are respectively calculated starting from channels or signals corresponding to respective physical channels of the multiple physical channels.

Before the first symbol of the finally determined one PUCCH or PUSCH, each physical channel, in which there is data needing to be transmitted, in the multiple physical channels should have sufficient time to prepare corresponding data to be transmitted. That is, before the first symbol of the finally determined PUCCH or PUSCH, there should be sufficient preparation time for generating the data to be transmitted in order to guarantee the data to be transmitted on time. The data to be transmitted is the data determined according to an agreed manner and formed based on information in the multiple physical channels, where the agreed manner herein may refer to the manner specified in the protocol TS 38.213. The timeline ending time in the embodiment is the first symbol of the finally determined PUCCH or PUSCH. The finally determined PUCCH or PUSCH may be one of the multiple physical channels that are currently overlapped, and may also be a physical channel other than the multiple physical channels, such as other PUCCH/PUSCH (the other physical channels are also configured for the UE, and may be selected from a PUCCH set or an SR PUCCH or a CSI PUCCH).

Another example is described below. In two typical time domain overlapping scenarios, the first scenario is that when there are multiple overlapping PUCCH channels, one PUCCH is finally selected to carry UCI information in the multiple PUCCH channels, and the remaining PUCCH channels are discarded. The second scenario is that when time domain overlapping occurs between PUCCH channel(s) and a PUSCH channel (there is generally one PUSCH, and if there are multiple PUSCHs, the multiple PUSCH channels are in a time division relationship), one PUSCH channel is finally selected to carry UCI information in the overlapping PUCCH channels, and data in the PUSCH channel is still transmitted in the PUSCH. These are two very typical scenarios.

Assuming that in the first scenario, PUCCH1 and PUCCH2 overlap in the time domain, wherein PUCCH1 is used to carry HARQ-ACK information corresponding to a previous PDSCH channel, and PUCCH2 is used to carry CSI information. In this scenario, it is finally determined to use PUCCH3, then the UE expects the first symbol of PUCCH3 to satisfy the following timeline requirement: (1) the first symbol of PUCCH3 is not earlier than time duration T1 required to prepare the HARQ-ACK information on PUCCH1 (obviously, the UE needs to decode the corresponding PDSCH first, and then confirm and generate the HARQ-ACK information, therefore, T1 contains the duration of processing the PDSCH. Sometimes, it is also possible to conduct this method as long as the UE knows the number of bits of the HARQ-ACK and does not need to know a specific bit value), where T1 is the number of symbols and can be calculated starting from the last symbol of the PDSCH corresponding to PUCCH1; (2) the first symbol of PUCCH 3 is not earlier than time duration T2 required to prepare the CSI information on PUCCH2 (the preparing of the CSI information also requires a certain amount of time, it is possible that there is a corresponding channel triggered before the acquisition of the CSI information, and it is also possible that the CSI and HARQ ACK need to be jointly encoded, and in this case, bit information of HARQ-ACK is required before CSI preparation, so that the CSI preparation time will become longer because the CSI preparation needs to be started after HARQ-ACK information is confirmed), where T2 is the number of symbols and can be calculated starting from the ending symbol of the channel triggering the CSI carried on PUCCH2 (herein, the channel refers to a channel that can always trigger PUCCH2, no manner PUCCH2 is dynamically triggered or semi-statically configured). That is to say, the starting symbol of PUCCH3 cannot be earlier than T1 and T2. Apparently, T1 and T2 correspond to different time lengths in different cases, and the time lengths of T1 and T2 are related to the types of UCI transmitted in PUCCH1 and PUCCH2, the transmission manners of the UCI in the two PUCCH channels and the processing capability of the UE. Apparently, T1 and T2 can always be obtained according to the foregoing three factors. For example, data of PUCCH1 and PUCCH2 may be processed in a certain sequence during preparation, for example, if joint coding is required, both data are generally required to be generated before the joint coding is started, which makes the data preparation a time consuming task. As another example, in the case of puncturing transmission, when preparing one set of data needing to be punctured, the other set of data can be simultaneously produced, which makes the data preparation a fast task. As still another example, for rate matching, when preparing one set of data needing to be punctured data, it is required to know at least the number of transmission bits contained in the other set of data (the specific bit values may not need to be acquired), which makes the data preparation a task requiring a medium amount of time.

A specific application example is given below. Since different physical channels have different types of data to be transmitted, the required preparation durations are different.

If a UE is to transmit multiple overlapping (overlapping in the time or frequency domain) PUCCHs (non-repeated PUCCHs) in one slot, as described in sections 9.2.5.1 and 9.2.5.2 of TS 38.213, the UE is configured to multiplex different types of UCI (e.g., HARQ-ACK, and/or SR, and/or periodic/semi-persistent CSI) in one PUCCH, the UE does not transmit overlapping PUSCH in the slot, and the UE multiplexes all corresponding types of UCI in one PUCCH. If one of the UCI types contains HARQ-ACK information, the UE expects that the first symbol of the PUCCH that is finally determined to be used in this slot is not earlier than the symbol numbered N1+X, herein the numbering starts from the last symbol of the symbols for PDSCH or SPS PDSCH release corresponding to the number; the UE also expects that the first symbol of the PUCCH that is finally determined to be used in this slot is not earlier than the symbol numbered N2+Y, herein the numbering starts from the last symbol of the symbols for PDCCH corresponding to the number. In the example, N1 is the number of symbols which corresponds to a PDSCH processing duration of a UE, and is referred to as PDSCH processing capability 1; N2 is the number of symbols which corresponds to a PUSCH preparation duration of the UE, and is referred to as PUSCH processing capability 1. If the UE is to transmit one or more overlapped PUCCH and PUSCH (non-repeated channels) in one slot, the UE multiplexes all corresponding types of UCI (HARQ-ACK, and/or SR, and/or periodic/semi-persistent CSI) in one PUSCH. The UE expects that, in this slot, the first symbol of the PUCCH or PUSCH finally determined to be used is not earlier than the symbol numbered N1+X, herein the symbol is the (N1+X)th symbol after the last symbol in the symbols for PDSCH or SPS PDSCH release corresponding to the number. The UE also expects that, in this slot, the first symbol of the PUCCH or PUSCH finally determined to be used is not earlier than the symbol numbered N2+Y, herein the symbol is the (N2+Y)th symbol after the last symbol in the symbols for PDCCH corresponding to the number. In this example, N1, N2, X and Y denote the number of OFDM symbols. The values of N1 and N2 can be set according to TS38.214, and the values of X and Y can be calculated according to the processing capabilities of the UE.

The working assumptions for sections 9.2.5.1 and 9.2.5.2 in TS 38.213 are as follows.
(1) For a UE, the transmission of SR and the transmission of HARQ-ACK overlap in a slot, or the transmission of SR and the transmission of periodic/semi-persistent CSI overlap.
(2) The case for multiplexing corresponding types of UCI in a single PUCCH is satisfied.
(3) The UE does not transmit any overlapping PUSCH in this slot in the same serving cell.

Example 2

When the timeline ending time is defined, a larger range of physical channels should be included. For example, in the related art, a physical channel with an earliest starting position is selected from the physical channels overlapping in the time domain as the timeline ending time. While in this embodiment, it is proposed that the selected physical channel should also include other physical channels that can be used for transmitting information in the physical channels overlapping in the time domain, and the earliest physical channel starting position is selected as the timeline ending time.

For example, for the cases m and n in FIG. 1 (the principle is the same for the cases shown in other figures), the timeline ending time according to the related art is considered to be the starting position of the earliest physical channel in the two physical channels overlapping in the time domain. However, if the two physical channels overlapping in the time domain are not finally used and another physical channel is finally selected, then several problems (see the previous analysis) may arise since the starting position of the finally selected physical channel is different from the starting position of the earliest physical channel.

Hence, it is proposed that for a UE, when multiple physical channels overlap in the time domain, the timeline ending time is defined to be a starting position of an earliest PUCCH among all PUCCHs, which include all PUCCHs that are possibly used finally in the PUCCH set(s) of the UE (one UE may be configured with one or more PUCCH sets) and/or all PUCCH resources that are possibly used finally in all the PUCCH resources of the UE (the PUCCH resources of the UE include the PUCCHs overlapping in the time domain).

In a first example, in the case m of FIG. 1, if PUCCH1 is in Format 3 and carries A/N information (which may be the A/N information obtained by multiplexing A/N corresponding to multiple transmission blocks of the UE), and PUCCH2 is in Format 1 and carries SR information, then according to the rule, PUCCH2 is discarded, and the SR is converted into X-bit information (related to the number of SRs) and then connected with A/N bits of PUCCH1, and is then transmitted using another PUCCH resources in Format 3. In the embodiment, which PUCCH resource in the Format 3 is specifically used may be determined in the following manner. A PUCCH set is first determined according to the total number of bits X and A/N and then transmission is conducted using the PUCCH resource indicated by the base station in the corresponding PUCCH set. Although the total number of bits transmitted by the PUCCH resources in each PUCCH set is different and corresponds to one bit number range, there is generally a great chance that the PUCCH set does not need to be changed, because the total number of bits carried by each PUCCH set has a large span, and the newly added bits are small, so that there is a great chance that the number of bits needing to be transmitted does not exceed the total bit range that can be carried by the original PUCCH set.

By using the above definition for the timeline ending time, since the earliest starting position of the PUCCH in all the PUCCHs may be used as the timeline ending time, the timeline ending time will not be later than the starting position of the finally transmitted PUCCH resource.

In a second example, in the case n of FIG. 1, if PUCCH1 is in Format 3 and carries CSI, and PUCCH2 is in Format 2 and carries CSI, then the CSI bits of PUCCH1 and the CSI bits of PUCCH2 are connected and transmitted using one PUCCH resource. In the embodiment, which PUCCH resource in the Format 3 is specifically used may be determined based on the PUCCH selection rule in the related art, and one PUCCH is selected from multiple allocated PUCCH resources according to the PUCCH selection rule in the related art to transmit all the CSI. In this embodiment, the timeline ending time is defined to be the starting position of the earliest PUCCH in all the PUCCH resources, so the timeline ending time will not be later than the starting position of the finally transmitted PUCCH resource.

In a third example, in the case n of FIG. 1, if PUCCH1 is in Format 3 and carries CSI, and PUCCH2 is in Format 1 and carries A/N, then according to the rule, PUCCH2 is discarded, and A/N information and CSI bits of PUCCH1 are connected in series and then transmitted using a PUCCH resource in Format 3. In the embodiment, which PUCCH resource in the Format 3 is specifically used may be determined in the following manner. A PUCCH set is first determined according to the total number of bits X and A/N and then transmission is conducted using the PUCCH resource indicated by the base station in the corresponding PUCCH set. Although the total number of bits transmitted by the PUCCH resources in each PUCCH set is different and corresponds to one bit number range, there is generally a great chance that the PUCCH set does not need to be changed, because the total number of bits carried by each PUCCH set has a large span, and the newly added bits are small, so that there is a great chance that the number of bits needing to be transmitted does not exceed the total bit range that can be carried by the original PUCCH set.

By using the above definition for the timeline ending time, the timeline ending time will not be later than the starting position of the finally transmitted PUCCH resource.

Example 3

Figure 9:
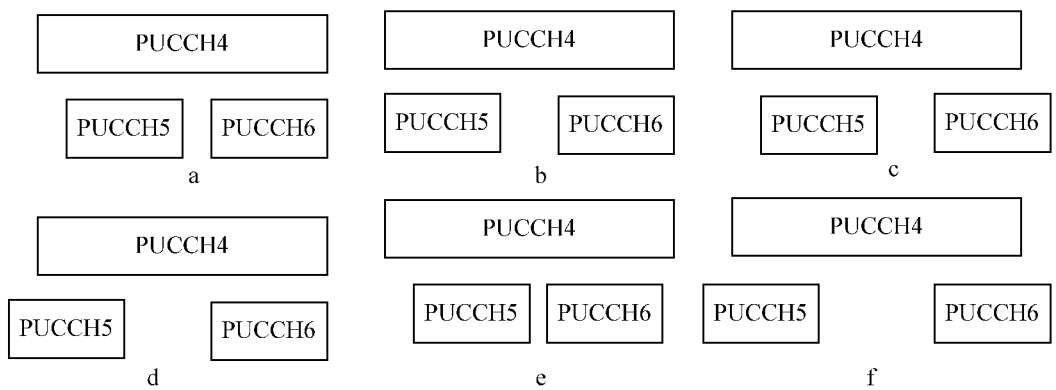
FIG. 9 is a schematic diagram of several possible cases of overlapping between one PUCCH and two time division PUCCH in the time domain according to the embodiment of the present disclosure.

One PUCCH channel may overlap with multiple time division PUCCH channels in the time domain. FIG. 9, which is a schematic diagram of several possible cases of overlapping between one PUCCH and two time division PUCCH in the time domain according to the embodiment of the present disclosure, provides several possible exemplary cases, and this embodiment is not limited to be applied to the cases shown in the schematic diagram of FIG. 9.

For a UE, if one PUCCH channel overlaps with multiple time division PUCCH channels in the time domain, it is a problem for the UE to determine how to transmit uplink control channels and how data in each uplink control channel is carried. In the solutions of the related art, there are several solutions for the case where two physical channels overlap in the time domain, for example, reference may be made to TS 38.213. However, there is no solution for time domain overlapping between more than two channels, especially for the case where one physical channel overlaps with two time division physical channels in the time domain.

Method 1

For a UE, if one PUCCH4 (the number used herein is only for distinguishing between different channels) and two time division PUCCHs (for example, PUCCH5 and PUCCH6) overlap in one slot in the time domain, the UE always selects to process one of the two time division PUCCHs and discard the other time division PUCCH. In this way, there are two PUCCHs overlapping in the time domain left, that is, the selected PUCCH and another PUCCH (for example, PUCCH4), and the two PUCCHs are treated in the way of treating two physical channels overlapping in the time domain. The operation of selecting one from the two time division PUCCHs may be implemented by the following method.

An nth PUCCH (in the time domain direction, n can be set as 1) is selected.

Alternatively, a PUCCH with the largest number of symbols is selected, and if the numbers of symbols are the same, then the nth PUCCH (n can be set as 1) in the PUCCHs with the largest number of symbols is selected.

Alternatively, a PUCCH with the least number of symbols is selected, and if the numbers of symbols are the same, then the nth PUCCH (n can be set as 1) in the PUCCHs with the least number of symbols is selected.

Alternatively, the base station indicates to the UE, through signalling, which PUCCH is selected, wherein the base station may indicate by downlink control information (DCI), or may implicitly indicate by a control channel element (CCE) of the DCI. For example, the base station may indicate which PUCCH to select by making the index of the first or last CCE of the DCI an even or odd value. For example, the CCE index being an even number indicates to select the first PUCCH, and the CCE index being an odd number indicates to select the second PUCCH.

Alternatively, a PUCCH satisfying the processing timeline requirement is selected (reference is made to the definitions for the timeline ending time in embodiments 1 and 2 or the related art, that is, the starting position of the PUCCH being later than the timeline ending time is considered to satisfy the processing timeline requirement). If there are multiple PUCCHs satisfying the processing timeline requirement, an nth PUCCH (n can be set as 1) satisfying the processing timeline requirement is selected. Generally, the earlier the starting time of the PUCCH is, the less easy it is to meet the processing timeline requirement. The base station knows the processing capability of each UE, and knows the positions of the three PUCCHs of the UE and the information carried in the three PUCCHs, therefore, the base station knows the timeline requirements of the UE based on the processing capability, and also knows the timeline ending time. Hence, the base station knows which PUCCH meets the processing timeline requirement.

Alternatively, the base station and the UE agree to reserve two time division PUCCHs and discard the other PUCCH (i.e. reserving PUCCH5 and PUCCH6 and discarding PUCCH4). The uplink control information (UCI) in PUCCH4 is carried in PUCCH5 or PUCCH6.

Among the cases where on PUCCH and two time division PUCCHs overlap in a slot in the time domain, a typical case is that one PUCCH which is periodically or semi-statically configured (for example, the PUCCH for carrying periodic CSI or a Scheduling Request (SR)) overlap with two dynamic time division PUCCHs (for example, the PUCCHs for carrying A/N information or aperiodic CSI) in the time domain.

For the above problem, the following processing mechanisms are further provided in the method 1.

Mechanism 1:

For a UE, if one PUCCH4 (the number used herein is only for distinguishing between different channels) overlap with two time division PUCCHs (for example, PUCCH5 and PUCCH6) in a slot in the time domain, the base station and the UE agree to always process the first two PUCCHs with the earliest starting positions (for example, in FIG. 9, there are always two PUCCHs whose starting positions are earlier than the other PUCCH in the three PUCCHs) to obtain the PUCCH used, and then treat the PUCCH used and the next PUCCH as two PUCCHs overlapping in the time domain. This processing mechanism can be extended, for example, a base station and a UE may make an agreement that the first n PUCCHs are always processed to obtain a processing result, the processing result and the (n+1)th PUCCH are processed together, . . . , similar processing is carried out for the remaining physical channels, so that a larger number of overlapping PUCCHs can be processed.

Mechanism 2:

For a UE, if one PUCCH4 (the number used herein is only for distinguishing between different channels) overlap with two time division PUCCHs (for example, PUCCH5 and PUCCH6) in a slot in the time domain, the UE always uses two time division PUCCHs, and discards the other PUCCH (i.e. PUCCH at the position of PUCCH4) (the UCI information in the other PUCCH is carried in the nth time division PUCCH, where n can be set as 1; or the UCI information in the other PUCCH is discarded).

Mechanism 3:

Mechanism 1 can be extended to handle the overlapping of multiple uplink physical channels of a UE, where the multiple uplink physical channels may be formed by one or more PUCCH and/or one or more PUSCH. In mechanism 3, when multiple uplink physical channels of the UE overlap, the base station and the UE agree to first process the time domain overlapping between the first and second uplink physical channels (the earlier physical channel is the first physical channel) of the multiple uplink physical channels to obtain an uplink physical channel, then process the obtained uplink physical channel and a third uplink physical channel of the multiple uplink physical channels according to the processing manner for two channels overlapping in the time domain (if the two channels do not overlap in the time domain, the mechanism 3 is not applied to the two channels, and the mechanism 3 continue to be applied for the remaining channels) to obtain a new uplink physical channel, and then process the obtained uplink physical channel and a fourth uplink physical channel according to the processing manner for two channels overlapping in the time domain, . . . , similar processing is carried out for the remaining physical channels. In this way, multiple uplink physical channels can be processed.

In the processing, if the starting positions of the channels are aligned, for example, the starting symbols of two or more uplink physical channels are the same, the physical channel with a smaller starting frequency domain index or a larger starting frequency domain index or a larger number of symbols or a smaller number of symbols may be selected.

Figure 10:
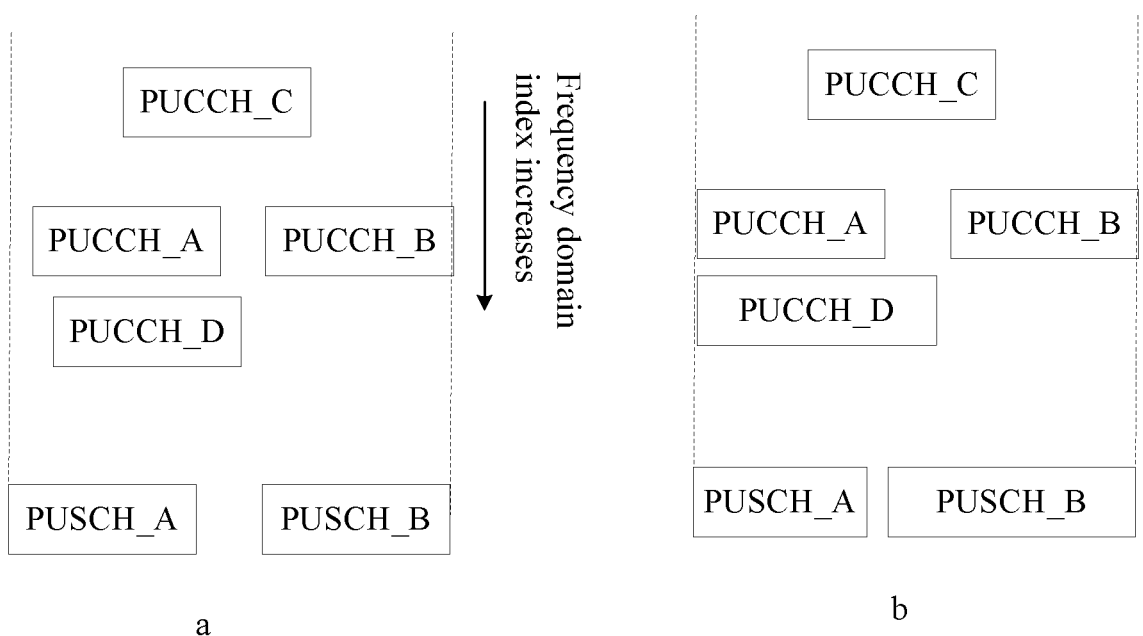
FIG. 10 is a schematic diagram showing the overlapping of uplink physical channels in the time domain in mechanism 3 according to an embodiment of the present disclosure.

An example is provided to illustrate the mechanism 3, For example, four uplink physical channel overlap in the time domain. FIG. 10 is a schematic diagram showing the overlapping of uplink physical channels in the time domain in mechanism 3 according to an embodiment of the present disclosure. In the diagram a of FIG. 10, the UE processes the PUSCH_A and the PUCCH_A first according to the mechanism 3, and the processing manner for the PUSCH_A and the PUCCH_A may adopt a manner in the related art (the processing manner in the related art is still in discussion, but the processing mechanism would be finally given in the TS38.213). The obtained processing result is that the UCI in PUCCH_A is transmitted in PUSCH_A, and PUCCH_A is discarded. Then, the PUSCH_A and the PUCCH_D are processed, and the obtained processing result is that the UCI in the PUCCH_D is also transmitted in the PUSCH_A and the PUCCH_D is discarded. After that, the PUSCH_A and the PUCCH_C are processed, and the obtained processing result is that the UCI in the PUCCH_C is also transmitted in the PUSCH_A, and the PUCCH_C is discarded. Then, the PUSCH_A and the PUCCH_B are processed, and since the PUSCH_A and the PUCCH_B do not overlap, no processing is performed in the present example. After the series of processing, there are three physical channels left, i.e., PUSCH_A, PUCCH_B and PUSCH_B. Since PUCCH_B and PUSCH_B overlap in the time domain, the two channels are processed, and the processing result is that the UCI in the PUCCH_B is transmitted in the PUSCH_B, and the PUCCH_B is discarded. Eventually there remains PUSCH_A (the data therein includes, in addition to the data in PUSCH_A, the UCI in PUCCH_A, PUCCH_D and PUCCH_C) and PUSCH_B (the data therein includes, in addition to data in PUSCH_B, the UCI in PUCCH_B). In the diagram b of FIG. 10, the UE first processes a PUCCH_A and a PUCCH_D according to mechanism 3, and the processing manner for the PUCCH_A and the PUCCH_D may adopt a manner in the related art (the processing manner in the related art is still in discussion, but the processing mechanism would be finally given in the TS38.213). In this example, it is assumed that the obtained processing result is that the PUCCH_A is reserved, and the PUCCH_D is discarded. Then, the PUCCH_A and the PUSCH_A are processed, and the obtained processing result is that the PUCCH_A is discarded and the PUSCH_A is reserved. After that, the PUSCH_A and the PUCCH_C are processed, and the obtained processing result is that the PUCCH_C is discarded and the PUSCH_A is reserved. Then, the PUSCH_A and the PUSCH_B are processed, but since the PUSCH_A and the PUSCH_B do not overlap, no further processing is performed. Eventually there remain PUSCH_A, PUCCH_B and PUSCH_B. Since PUCCH_B and PUSCH_B overlap in the time domain, the two channels are processed, and the processing result is that the UCI in the PUCCH_B is transmitted in the PUSCH_B and the PUCCH_B is discarded. After the series of processing, there are two physical channels left, i.e., PUSCH_A (which carries the UCI in PUCCH_A, PUCCH_D and PUCCH_C in addition to the data in PUSCH_A) and PUSCH_B (which carries the UCI in PUCCH_B in addition to the data in PUSCH_B).

An effective supplementation is proposed for the mechanism 3. It is to be noted that when two uplink physical channels overlapping in the time domain are processed, an uplink physical channel is obtained, and this obtained uplink physical channel may or may not be from the foregoing two uplink physical channels overlapping in the time domain. For example, the channel may be from a PUCCH set configured for the UE or from PUCCH resources configured for the UE. In the case that the obtained uplink physical channel is not from the foregoing two uplink physical channels overlapping in the time domain, the obtained uplink physical channel and the unprocessed channels in the multiple uplink physical channels are processed based on the foregoing mechanism 3.

In the method 1, if two channels overlapping in the time domain need to be processed, an existing processing mechanism may be adopted. For example, an existing processing mechanism can be used according to the type of information carried in the PUCCH channel, and reference is made to TS38.213.

Method 2:

Compared with the method 1 which is a simple method and is easy to implement, the method 2 performs refined processing according to the type of the UCI carried by the channels overlapping in the time domain, and reference may be made to Table 1-Table 4 for details.

The timeline ending time in the embodiments 1 and 2 may be used for confirmation, for example, in the overlapping case illustrated in FIG. 9, all channels overlapping in the time domain are always considered to satisfy the foregoing timeline ending time. Further, since there are currently five PUCCH formats (denoted as F0, F1, F2, F3, F4) in the NR system, the definitions and the data transmission modes differ for different PUCCH formats, and the contents of the UCI to be transmitted may also differ for different PUCCH formats, the embodiment of the present disclosure provides as many processing schemes as possible. The processing of time domain overlapping between one A/N PUCCH and two time division SR PUCCHs is shown in Table 1. Table 1 is the processing of time domain overlapping between one A/N PUCCH and two time division SR PUCCHs.

TABLE 1

| One A/N PUCCH (similar to the position of PUCCH4 in FIG. 9) | Two time division SR PUCCHs (similar to the positions of PUCCH5 and PUCCH6 in FIG. 9) | | Processing manner ("or" relation between different manners) |
|---|---|---|---|
| F1 | F1 | F1 | Manner 1: One SR PUCCH (which is agreed to be the first or second PUCCH) is always selected to be processed: If the selected SR PUCCH has an SR request, processing is performed according to the processing manner for the case where an A/N PUCCH and an SR PUCCH overlap in the time domain in the related art (currently, there is a processing manner for the case where the A/N PUCCH and the SR PUCCH have aligned starting symbol, while the processing manner for the case where the A/N PUCCH and the SR PUCCH do not have aligned starting symbol is still in discussion, and there are multiple candidate manners available, but finally one manner will be provided), the other SR is not affected by the time domain overlapping (still processed according to the case where there is no time domain overlapping, i.e. if there is an SR request, the SR request is transmitted in the SR PUCCH, and if there is no SR request, no SR request is transmitted). If the selected SR PUCCH has no SR request, the other SR PUCCH is discarded. Manner 1-1: One SR PUCCH (which is appointed as the first or second one) and the A/N PUCCH are processed according to the manner in the related art, and the other SR PUCCH is always discarded. It should be noted that processing according to the manner in the related art refers to processing according to a protocol rule in the related art. |
| | F1 | F0 | Manner 1 is used. Manner 1-1 is used. Manner 2: A/N PUCCH and SR PUCCH F0 are processed according to the rule in the related art, and SR PUCCH F1 is not affected by time domain overlapping. Manner 3: the A/N PUCCH and the SR PUCCH F1 are processed according to the rule in the related art, and the SR PUCCH F0 is discarded. |
| | F0 | F1 | Manner 1 is used. Manner 1-1 is used. Manner 2 is used. Manner 3 is used. |
| | F0 | F0 | Manner 1 is used. Manner 1-1 is used. |
| F0 | F1 | F1 | Manner 1 is used. Manner 1-1 is used. |
| | F1 | F0 | Manner 1 is used. Manner 1-1 is used. Manner 2 is used. Manner 3 is used. |
| | F0 | F1 | Manner 1 is used. Manner 1-1 is used. Manner 2 is used. Manner 3 is used. |
| | F0 | F0 | Manner 1 is used. Manner 1-1 is used. |

The processing for the case where an SR PUCCH and two time division A/N PUCCHs overlap in the time domain is shown in Table 2. Table 2 is a processing for the case where an SR PUCCH and two time division A/N PUCCH overlap in the time domain.

TABLE 2

| One SR PUCCH (similar to the position of PUCCH4 in FIG. 9) | Two time division A/N PUCCHs (similar to positions of PUCCH5 and PUCCH6 in FIG. 9) | | Processing manner ("or" relation between different manners) |
|---|---|---|---|
| F1 | F1 | F1 | Manner 4 of selecting one A/N PUCCH (which is appointed to be the first one or the second one) to always be processed:<br>If the SR PUCCH has an SR request, processing is performed according to the manner adopted in the related art for the case where an A/N PUCCH (the selected one) overlaps with an SR PUCCH in the time domain, and the other A/N PUCCH is discarded.<br>If the SR PUCCH does not have an SR request, the two A/N PUCCHs are not affected (transmitted according to the related art).<br>Manner 5:<br>One A/N PUCCH (which is appointed to be the first one or the second one) and an SR PUCCH are processed according to the manner adopted in the related art, and the other A/N PUCCH is discarded. |
|  | F1 | F0 | Manner 6 of selecting one A/N PUCCH (which is appointed to be the first or second one) to always be processed:<br>If the first one is selected, i.e., A/N PUCCH F1 is selected, then:<br>If the SR PUCCH has an SR request, processing is performed according to the manner in the related art for the case where the A/N PUCCH (the selected one) and the SR PUCCH overlap in the time domain, and the other A/N PUCCH is discarded;<br>if the SR PUCCH does not have an SR request, neither of the two A/N PUCCHs is affected.<br>If the second one is selected, i.e., A/N PUCCH F0 is selected, then:<br>If the SR PUCCH has an SR request, processing is performed according to the manner in the related art for the case where the A/N PUCCH (the selected one) and the SR PUCCH overlap in the time domain, and the other A/N PUCCH is not affected;<br>if the SR PUCCH does not have an SR request, neither of the two A/N PUCCHs is affected.<br>Manner 5 is used. |
|  | F0 | F1 | Manner 5 is used.<br>Manner 6 is used. |
|  | F0 | F0 | Manner 5 is used.<br>Manner 7 of selecting one A/N PUCCH (which is appointed to be the first one or the second one) to always be processed:<br>If the SR PUCCH has an SR request, the processing is performed according to the manner in the related art for the case where the A/N PUCCH (the selected one) and the SR PUCCH overlap in the time domain, and the other A/N PUCCH is not affected.<br>If the SR PUCCH does not have an SR request, the two A/N PUCCHs are not affected (transmitted according to the related art). |
| F0 | F1 | F1 | Manner 5 is used.<br>Manner 7 is used. |
|  | F1 | F0 | Manner 8 of selecting one A/N PUCCH (which is appointed to be the first or second one) to always be processed:<br>If the first one is selected, i.e., A/N PUCCH F1 is selected, then:<br>If an SR PUCCH has an SR request, processing is performed according to the manner in the related art for the case where the A/N PUCCH (the selected one) and the SR PUCCH overlap in the time domain, and the other A/N PUCCH is not affected;<br>If the SR PUCCH does not have an SR request, neither of the two A/N PUCCHs is affected. |

TABLE 2-continued

| One SR PUCCH (similar to the position of PUCCH4 in FIG. 9) | Two time division A/N PUCCHs (similar to positions of PUCCH5 and PUCCH6 in FIG. 9) | | Processing manner ("or" relation between different manners) |
|---|---|---|---|
| | | | If the second one is selected, i.e., A/N PUCCH F0 is selected, then: if the SR PUCCH has an SR request, processing is performed according to the manner in the related art for the case where the A/N PUCCH (the selected one) overlaps with the SR PUCCH in the time domain, and the other A/N PUCCH is discarded; If the SR PUCCH does not have an SR request, neither of the two A/N PUCCHs is affected. Manner 5 is used. |
| | F0 | F1 | Manner 5 is used. Manner 8 is used. |
| | F0 | F0 | Manner 4 is used. Manner 5 is used. |

The processing for the case where one A/N PUCCH and two time division PUCCHs (one for SR and the other for A/N) overlap in the time domain is shown in Table 3. Table 3 is a processing for the time domain overlapping between one A/N PUCCH and two time division PUCCHs.

TABLE 3

| One A/N PUCCH (similar to the position of PUCCH4 in FIG. 9) | The first channel is SR PUCCH and the second channel is A/N PUCCH (similar to the positions of PUCCH5 and PUCCH6 in FIG. 9) | | Processing manner ("or" relation between different manners) |
|---|---|---|---|
| F1 | F1 | F1 | Manner 9: The first two A/N PUCCH channels are processed first. The third PUCCH processing is then determined according to the processing result: If the first two PUCCH channel processing results are using the PUCCH at the position of PUCCH4, the other PUCCH is discarded. If the first two PUCCH channel processing results are using the PUCCH at the position of PUCCH5, then the other PUCCH is unaffected (normal transmission). If two A/N PUCCH channel processing results are that a new PUCCH is used and the new PUCCH does not overlap with the third PUCCH in the time domain, then the third PUCCH is not affected. If the new PUCCH is time-domain overlapped with the third PUCCH, the third PUCCH is discarded. Manner 10: One (the first or second one) of the two PUCCHs of the time division is selected and the other PUCCH is processed according to the related art, and the unselected PUCCHs are always discarded. |
| | F1 | F0 | Manner 9 is used. Manner 10 is used. |
| | F0 | F1 | Manner 9 is used. Manner 10 is used. |
| | F0 | F0 | Manner 9 is used. Manner 10 is used. |
| F0 | F1 | F1 | Manner 9 is used. Manner 10 is used. |
| | F1 | F0 | Manner 9 is used. Manner 10 is used. |
| | F0 | F1 | Manner 9 is used. Manner 10 is used. |
| | F0 | F0 | Manner 9 is used. Manner 10 is used. |

The processing for the case where one A/N PUCCH and two time division PUCCHs (one is for SR and the other is for A/N) overlap in the time domain is shown in table 4. Table 4 is the processing for the case where one A/N PUCCH and two time division PUCCHs overlap in the time domain.

TABLE 4

| One A/N PUCCH | The first channel is A/N PUCCH and the second channel is SR PUCCH | | Treatment |
|---|---|---|---|
| F1 | F1 | F1 | Manner 9 is used. Manner 10 is used. |
|  | F1 | F0 | Manner 9 is used. Manner 10 is used. |
|  | F0 | F1 | Manner 9 is used. Manner 10 is used. |
|  | F0 | F0 | Manner 9 is used. Manner 10 is used. |
| F0 | F1 | F1 | Manner 9 is used. Manner 10 is used. |
|  | F1 | F0 | Manner 9 is used. Manner 10 is used. |
|  | F0 | F1 | Manner 9 is used. Manner 10 1S used. |
|  | F0 | F0 | Manner 9 is used. Manner 10 is used. |

The definition for the timeline ending time in this embodiment is more accurate than the mechanism in the related art, and is more beneficial to the timeline arrangement in product implementation, so that the timeline is more compact and efficient.

Embodiment 4

The embodiment of the present disclosure provides a storage medium. The storage medium stores a computer program. The computer program is configured to execute the operations in any one of the method embodiments when running.

In one or more exemplary implementations of the present embodiment, the storage medium may be configured to store a computer program for executing the following operations:

In operation S1, it is determined that a first physical channel and one or more physical channels overlap in a time domain;

In operation S2, a starting position of a designated channel which is determined to be used is set as timeline ending time.

In one or more exemplary implementations of the present embodiment, the storage medium may include, but is not limited to, any medium that can store a computer program, such as a USB flash drive, a Read-Only Memory (ROM), a Random Access Memory (RAM), a movable hard disk, a magnetic disk, or an optical disc.

The embodiment of the present disclosure provides an electronic device, including a memory and a processor. The memory stores a computer program. The processor is configured to run the computer program to execute operations in any one of the method embodiments.

In one or more exemplary implementations of the present embodiment, the electronic device may further include a transmission device and an input/output device, wherein the transmission device is connected to the processor, and the input/output device is connected to the processor.

In one or more exemplary implementations of the present embodiment, the processor may be configured to execute the following operations based on a computer program:

In operation S1, it is determined that a first physical channel and one or more physical channels overlap in a time domain;

In operation S2, a starting position of a designated channel which is determined to be used is set as timeline ending time.

Optionally, for specific examples in this embodiment, reference may be made to the examples described in the foregoing embodiments and exemplary implementations, and details are not repeatedly described herein in this embodiment.

Obviously, those skilled in the art should understand that the modules or operations of the present disclosure described above can be implemented by a general-purpose computing device, and they can be concentrated on a single computing device or distributed on a network composed of multiple computing devices. Optionally, they may be implemented by program codes executable by a computing device, so that they may be stored in a storage device and executed by the computing device. In certain cases, the illustrated or described operations may be executed in an order different from the order described here. Alternatively, they are manufactured into integrated circuit modules respectively, or multiple modules or operations are manufactured into a single integrated circuit module for implementation. As such, the present disclosure is not limited to any particular hardware and software combination.

What is claimed is:

1. A wireless communication method, comprising:
multiplexing different types of uplink control information (UCI) in one physical uplink control channel (PUCCH) from multiple PUCCHs in response to the multiple PUCCHs that are to be transmitted and that are overlapping in a slot,
  wherein in response to the multiple PUCCHs comprising a first PUCCH and a second PUCCH, the first PUCCH is earlier in time than the second PUCCH, and
  wherein in response to the multiple PUCCHs comprising two PUCCHs that have a same first symbol, one of the two PUCCHs has a number of symbols that is greater than that of another of the two PUCCHs; and
transmitting the one PUCCH comprising the different types of UCI.

2. The method of claim 1, wherein the multiplexing the different types of UCI in the one PUCCH includes multiplexing a hybrid automatic repeat request (HARQ-ACK), scheduling request (SR), and channel state information (CSI) in the one PUCCH.

3. The method as claimed in claim 1,
wherein a first orthogonal frequency division multiplexing (OFDM) symbol of the one PUCCH starts not earlier than timeline ending time of any one of preparation durations required for preparation of information to-be transmitted, and
wherein at least one of the preparation durations is calculated starting from a last symbol of channels corresponding to at least one of the multiple PUCCHs.

4. The method of claim 3,
wherein the preparation durations T1 to Tn are required for preparation of the information to-be transmitted, data, wherein n is a number of the multiple PUCCHs and is a positive integer greater than 1.

5. A wireless communication method, comprising:
receiving one physical uplink control channel (PUCCH) comprising different types of uplink control information (UCI),
wherein the different types of UCI are multiplexed in the one PUCCH from multiple PUCCHs in response to the multiple PUCCHs that are to be received and that are overlapping in a slot,
wherein in response to the multiple PUCCHs comprising a first PUCCH and a second PUCCH, the first PUCCH is earlier in time than the second PUCCH, and
wherein in response to the multiple PUCCHs comprising two PUCCHs that have a same first symbol, one of the two PUCCHs has a number of symbols that is greater than that of another of the two PUCCHs.

6. The method of claim 5, wherein the different types of UCI are multiplexed in the one PUCCH by having a hybrid automatic repeat request (HARQ-ACK), scheduling request (SR), and channel state information (CSI) multiplexed in the one PUCCH.

7. The method as claimed in claim 5,
wherein a first orthogonal frequency division multiplexing (OFDM) symbol of the one PUCCH starts not earlier than timeline ending time of any one of preparation durations required for preparation of information to-be transmitted, and
wherein at least one of the preparation durations is calculated starting from a last symbol of channels corresponding to at least one of the multiple PUCCHs.

8. The method of claim 7,
wherein the preparation durations T1 to Tn are required for preparation of the information to-be transmitted, wherein n is a number of the multiple PUCCHs and is a positive integer greater than 1.

9. A wireless communication apparatus, comprising:
a processor configured to implement a method, wherein the processor is configured to:
multiplex different types of uplink control information (UCI) in one physical uplink control channel (PUCCH) from multiple PUCCHs in response to the multiple PUCCHs that are to be transmitted and that are overlapping in a slot,
wherein in response to the multiple PUCCHs comprising a first PUCCH and a second PUCCH, the first PUCCH is earlier in time than the second PUCCH, and
wherein in response to the multiple PUCCHs comprising two PUCCHs that have a same first symbol, one of the two PUCCHs has a number of symbols that is greater than that of another of the two PUCCHs; and
transmit the one PUCCH comprising the different types of UCI.

10. The wireless communication apparatus of claim 9, wherein the multiplexing the different types of UCI in the one PUCCH includes multiplexing a hybrid automatic repeat request (HARQ-ACK), scheduling request (SR), and channel state information (CSI) in the one PUCCH.

11. The wireless communication apparatus of claim 9,
wherein a first orthogonal frequency division multiplexing (OFDM) symbol of the one PUCCH starts not earlier than timeline ending time of any one of preparation durations required for preparation of information to-be transmitted, and
wherein at least one of the preparation durations is calculated starting from a last symbol of channels corresponding to at least one of the multiple PUCCHs.

12. The wireless communication apparatus of claim 11, wherein the preparation durations Ti to Tn are required for preparation of the information to-be transmitted, wherein n is a number of the multiple PUCCHs and is a positive integer greater than 1.

* * * * *